(12) United States Patent
McCallister et al.

(10) Patent No.: US 6,366,619 B1
(45) Date of Patent: Apr. 2, 2002

(54) CONSTRAINED-ENVELOPE TRANSMITTER AND METHOD THEREFOR

(75) Inventors: Ronald D. McCallister, Scottsdale; Bruce A. Cochran, Mesa; Bradley P. Badke, Chandler, all of AZ (US)

(73) Assignee: Sicom, Inc., Scottsdale, AZ (US)

( * ) Notice: Subject to any disclaimer, the term of this patent is extended or adjusted under 35 U.S.C. 154(b) by 0 days.

(21) Appl. No.: 09/635,990

(22) Filed: Aug. 9, 2000

Related U.S. Application Data

(63) Continuation of application No. 09/143,230, filed on Aug. 28, 1998, now Pat. No. 6,104,761.

(51) Int. Cl.$^7$ .......................... H04L 27/04; H04L 27/12; H04L 27/20
(52) U.S. Cl. ...................................................... 375/295
(58) Field of Search ............................... 375/130, 135, 375/146, 261, 285, 259, 268, 271, 279, 295, 281, 284, 286, 291, 298, 300, 302, 308, 377, 240, 297; 332/103, 144, 149; 370/335, 342, 441

(56) References Cited

U.S. PATENT DOCUMENTS

| | | | |
|---|---|---|---|
| 5,049,832 A | 9/1991 | Cavers | 330/149 |
| 5,287,387 A | 2/1994 | Birchler | 375/60 |
| 5,381,449 A | 1/1995 | Jasper et al. | 375/59 |
| 5,479,448 A | 12/1995 | Seshadri | 375/267 |
| 5,566,164 A | 10/1996 | Ohlson | 370/18 |
| 5,579,342 A | 11/1996 | Crozier | 375/296 |
| 5,600,676 A | 2/1997 | Ramesh | 375/283 |
| 5,606,578 A | 2/1997 | O'Dea | 375/298 |
| 5,621,762 A | 4/1997 | Miller et al. | 375/298 |
| 5,629,961 A | 5/1997 | Kawabata | 375/308 |
| 5,638,403 A | 6/1997 | Birchler et al. | 375/296 |
| 5,638,404 A | 6/1997 | Crozier | 375/296 |
| 5,696,794 A | 12/1997 | O'Dea | 375/296 |
| 5,727,026 A | 3/1998 | Beukema | 375/296 |
| 5,805,640 A | 9/1998 | O'Dea et al. | 375/296 |
| 5,978,068 A | 11/1999 | Cassia et al. | 375/281 |
| 6,097,711 A | 8/2000 | Okawa et al. | 370/335 |
| 2001/0000456 A1 * | 4/2001 | McGowan | 370/342 |

OTHER PUBLICATIONS

Miller, Scott L. and O'Dea, Robert J., "Adaptive Peak Suppression for Power and Bandwidth Efficient Linear Modulation", IEEE.
Amoroso, Frank and Monzingo, Robert A., "Digital Data Signal Spectral Side Lobe Regrowth in Soft Saturating Amplifiers", *Microwave Journal*, Feb. 1998, pp. 126–131.
Amoroso, Frank and Monzingo, Robert A., "Spectral Side-lobe Regrowth in Saturating Amplifiers", *Applied Microwave and Wireless*, Mar. 1998, pp. 36–42.

* cited by examiner

*Primary Examiner*—Jean Corrielus
(74) *Attorney, Agent, or Firm*—Lowell W. Gresham; Jordan M. Meschkow; Meschkow & Gresham, P.L.C.

(57) ABSTRACT

A constrained-envelope digital-communications transmitter circuit (22) includes a binary data source (32) that provides an input signal stream (34) to a modulator (77,77'). The modulator (77,77') includes a pulse-spreading filter (76) that filters a phase-point signal stream (50) or a composite signal stream (168) into a modulated signal (74). A constrained-envelope generator (106) generates a constrained-bandwidth error signal stream (108) from the modulated signal (74), and a delay element (138) delays the modulated signal (74) into a delayed modulated signal (140) synchronized with the constrained-bandwidth error signal stream (108). A complex summing circuit (110) sums the delayed modulated signal (140) and the constrained-bandwidth error signal stream (108) into an altered modulated signal (112), and a substantially linear amplifier (146) amplifies the altered modulated signal (112) and transmits it as a radio-frequency broadcast signal (26).

20 Claims, 5 Drawing Sheets

CONSTRAINED-ENVELOPE TRANSMITTER AND METHOD THEREFOR

RELATED PATENTS

The present invention is a continuation-in-part of "A Constrained-Envelope Digital-Communications Transmission System And Method Therefor," by Ronald D. McCallister, Bruce A. Cochran and Bradley P. Badke, filed Aug. 28, 1998, Ser. No. 09/143,230, which is incorporated herein by reference.

TECHNICAL FIELD OF THE INVENTION

The present invention relates generally to the field of electronic communications. More specifically, the present invention relates to the field of constrained-envelope digital transmitter circuits.

BACKGROUND OF THE INVENTION

A wireless digital communications system should ideally refrain from using any portion of the frequency spectrum beyond that actually required for communications. Such a maximally efficient use of the frequency spectrum would allow the greatest number of communications channels per given spectrum. In the real-world, however, some spectral regrowth (i.e., increase in spectral bandwidth) is inevitable due to imperfect signal amplification.

In wireless communication systems various methodologies have been used to minimize spectral regrowth. Some conventional methodologies utilize complex digital signal processing algorithms to alter a digitally modulated transmission signal in some manner conducive to minimal spectral regrowth. Such complex algorithmic methodologies are well suited to low-throughput applications, i.e., those less than 0.5 Mbps (megabits per second), such as transmission of vocoder or other audio data. This is because the low throughput rate allows sufficient time between symbols for the processor to perform extensive and often repetitive calculations to effect the required signal modification. Unfortunately, high-throughput applications, i.e., those greater than 0.5 Mbps, such as the transmission of high-speed video data, cannot use complex processing algorithms because the processing power required to process the higher data rate is impractical.

A digital signal processing methodology may be used with the transmission of burst signals. With burst transmissions, the interstitial time between bursts may be used to perform the necessary complex computations based upon an entire burst. This methodology is not practical when continuous (as opposed to burst) transmission is used.

A conventional form of post-modulation pulse shaping to minimize spectral bandwidth utilizes some form of Nyquist-a type filtration, such as Nyquist, root-Nyquist, raised cosine-rolloff etc. Nyquist-type filters are desirable as they provide a nearly ideal spectrally constrained waveform and negligible inter-symbol interference. This is achieved by spreading the datum for a single constellation phase point over many unit intervals in such a manner that the energy from any given phase-point datum does not interfere with the energy from preceding and following phase-point data at the appropriate interval sampling instants.

The use of Nyquist-type filtration in a transmission circuit produces a filtered signal stream containing a pulse waveform with a spectrally constrained waveform. The degree to which a Nyquist-type pulse waveform is constrained in bandwidth is a function of the excess bandwidth factor, $\alpha$.

The smaller the value of $\alpha$, the more the pulse waveform is constrained in spectral regrowth. It is therefore desirable to have the value of $\alpha$ as small as possible. However, as the value of $\alpha$ is decreased, the ratio of the spectrally constrained waveform magnitude to the spectrally unconstrained waveform magnitude is increased. The spectrally unconstrained waveform is the waveform that would result if no action were taken to reduce spectral regrowth. Typical designs use $\alpha$ values of 0.10 to 0.5. For an exemplary $\alpha$ value of 0.2, the magnitude of the spectrally constrained waveform is approximately 1.8 times that of the unconstrained waveform. This means that, for a normalized spectrally unconstrained waveform magnitude power of 1.0, the transmitter output amplifier must actually be able to provide an output power of 3.24 ($1.8^2$) to faithfully transmit the spectrally constrained waveform. This poses several problems.

When the transmitter output amplifier is biased so that the maximum spectrally unconstrained waveform (1.0 normalized) is at or near the top of the amplifier's linear region, all "overpower" will be clipped as the amplifier saturates. Such clipping causes a marked increase in spectral regrowth, obviating the use of Nyquist-type filtration.

Biasing the transmitter output amplifier so that the spectrally constrained waveform is at or near the top of the amplifier's linear region requires that the output amplifier be of significantly higher power than that required for the transmission of a spectrally unconstrained waveform. Such a higher-power amplifier is inherently more costly than its lower-power counterparts.

A similar dilemma occurs in connection with the incorporation of transmit power amplifiers in code division multiple access (CDMA) communication systems, and particularly at hubs or base stations of CDMA communication systems. At a CDMA hub or base station, many code-channels are often combined into a composite CDMA signal by adding the many code-channels together on a chip-by-chip basis. Most often, some channels cancel others, and the resultant composite signal exhibits a modest magnitude. Consequently, the average power level of the composite signal may be relatively low. However, on infrequent occasions chip intervals occur where none or only a few of the channels cancel in the composite signal. When this happens, the resultant composite signal exhibits an extremely large peak value. In order to faithfully reproduce the composite signal, a power amplifier should be capable of reproducing the infrequent extremely large peak value without clipping or distortion. Clipping or distortion would lead to unwanted spectral regrowth and to diminished capacity by contributing to a loss of orthogonality between the code-channels.

In many conventional CDMA systems, the peak-to-average power amplifier constraints are so severe that, in order to ameliorate the peak-to-average power ratio and allow the use of less expensive, more efficiently used power amplifiers, non-ideal pulse shaping filters are used. While the non-ideal filters ameliorate peak-to-average power constraints, they lead to a worsening of inter-chip interference.

SUMMARY OF THE INVENTION

It is an advantage of the present invention that an improved constrained-envelope transmitter and method therefor are provided.

Another advantage is that a constrained-envelope generator is provided to generate a signal which, when combined with a modulated signal that exhibits a predetermined bandwidth, reduces peak-to-average power ratio without increasing the predetermined bandwidth.

Another advantage is that a modulated signal which exhibits a desired bandwidth but undesirably large peak-to-average power ratio is adjusted to lessen the peak-to-average power ratio without increasing bandwidth.

Another advantage is that, in one embodiment, a CDMA modulator provides a modulation signal that is a composite of many code-channels and exhibits an undesirably high peak-to-average power ratio, and the composite modulation signal is adjusted so that the adjusted signal may be faithfully amplified by a relatively inexpensive power amplifier otherwise incapable of faithfully reproducing the undesirably high peak-to-average power ratio.

The above and other advantages of the present invention are realized in one form by a constrained-envelope digital communications transmitter circuit. The transmitter circuit includes a modulated-signal generator for generating a first modulated signal conveying to-be-communicated data, having a first bandwidth and having a first peak-to-average amplitude ratio. The transmitter circuit also includes a constrained-envelope generator for generating an constrained bandwidth error signal in response to said first modulated signal. A combining circuit combines the constrained bandwidth error signal with said first modulated signal to produce a second modulated signal. The second modulated signal conveys the to-be-communicated data and exhibits substantially the first bandwidth and a second peak-to-average amplitude ratio. The second peak-to-average amplitude ratio is less than the first peak-to-average amplitude ratio. A substantially linear amplifier amplifies the second modulated signal.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figures 1, 2:
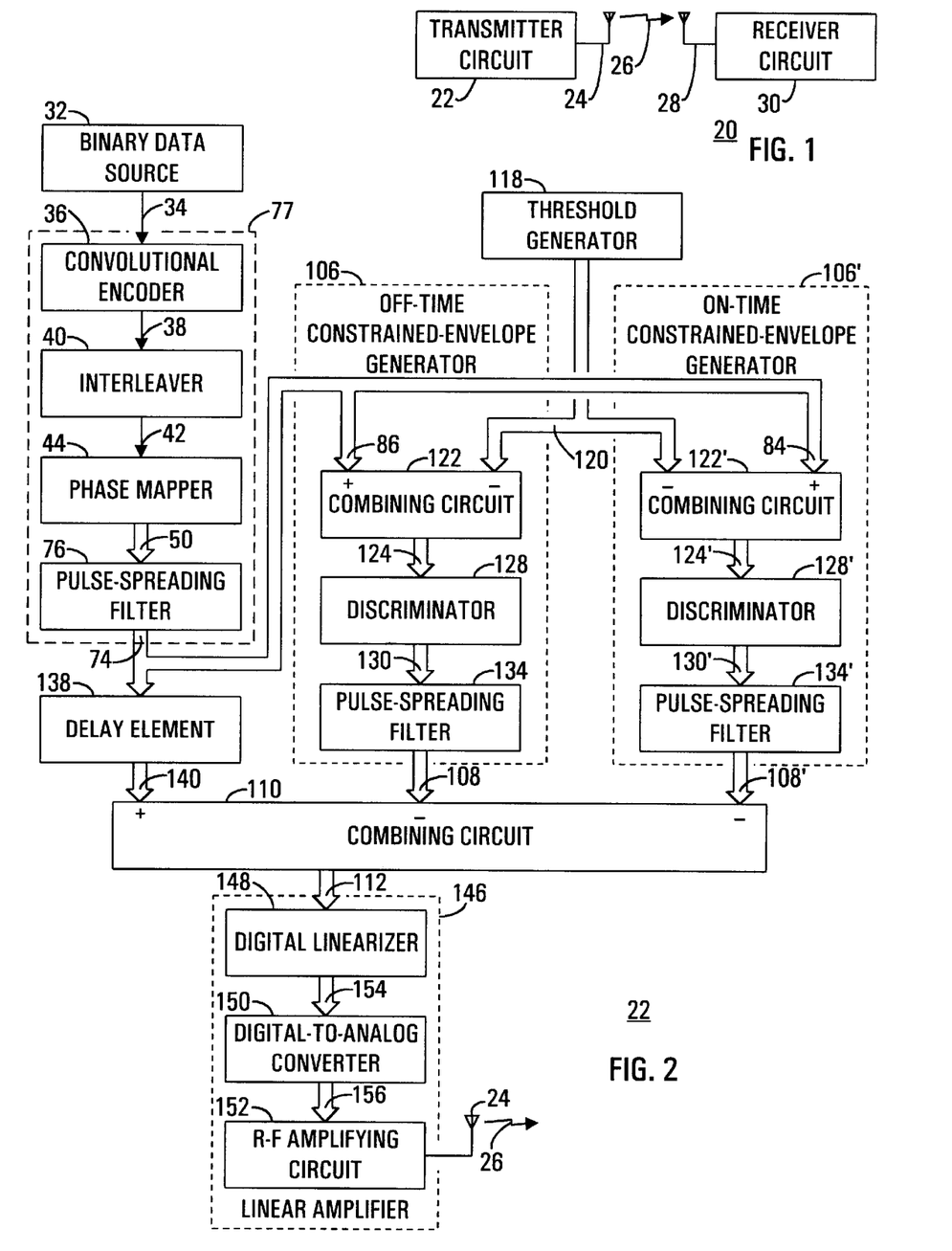
FIG. 1 depicts a simplified block diagram of a digital communications system in accordance with a preferred embodiment of the present invention.
FIG. 2 depicts a block diagram of a constrained-envelope digital communications transmitter circuit in accordance with a preferred embodiment of the present invention.

FIG. 1 depicts a simplified block diagram of a digital communications system 20. FIG. 2 depicts a block diagram of a constrained-envelope digital communications transmitter circuit 22 in accordance with a preferred embodiment of the present invention. The embodiment of transmitter circuit 22 shown in FIG. 2 is of particular benefit in time division multiple access (TDMA) and/or frequency division multiple access (TDMA) communication systems 20. The following discussion refers to FIGS. 1 and 2.

Digital communications system 20, as depicted in FIG. 1, includes a transmitter circuit 22 and a transmitter antenna 24 together configured to modulate and transmit a radio-frequency (RF) broadcast signal 26 to a receiver antenna 28 and a receiver circuit 30, together configured to receive and demodulate RF broadcast signal 26. Those skilled in the art will appreciate that the embodiment of system 20 depicted is a simplistic one for purposes of discussion only. In normal use, system 20 would likely be a complex system consisting of many more components and broadcast signals. It will be appreciated that the use of such a complex communications system for system 20 in no way departs from the spirit of the present invention or the scope of the appended claims.

Transmitter circuit 22 has a binary data source 32 providing a binary input signal stream 34 of to-be-communicated data. Binary data source 32 may be any circuitry, device, or combination thereof producing input signal stream 34. Input signal stream 34 is made up of binary data that may be pre-encoded in any desired manner. That is, input signal stream 34 may be made up of data that has no encoding, concatenated encoding, Reed-Solomon block encoding, or any other form of encoding desired for or required of the communications scheme in use. In addition, input signal stream 34 may include data intended to be communicated to any number of diverse destinations or end users.

In this preferred embodiment, input signal stream 34 is a stream of continuous data (as contrasted with burst data) passing to an input of a convolutional encoder 36, but continuous data is not a requirement of the present invention. Convolutional encoder 36 convolutionally encodes (e.g., Viterbi or turbo encodes) input signal stream 34 into an encoded signal stream 38. The use of convolutional encoder 36 in transmitter circuit 22 and a like convolutional decoder (not shown) in receiver circuit 30 significantly reduces the error rate of the overall signal in a manner well understood by those skilled in the art. However, convolutional encoder 36 may be omitted.

Interleaver 40 temporally decorrelates encoded signal stream 38 to produce an interleaved signal stream 42. That is, the symbols making up the binary signal stream are temporally decorrelated (i.e., separated) in transmitter circuit 22 and temporally correlated in receiver circuit 30. This is done so that correlated errors produced by downstream transmitter components, discussed hereinbelow, will then be decorrelated through a complimentary de-interleaver located in receiver circuit 30 before convolutional decoding in receiver circuit 30.

In this preferred embodiment, interleaved signal stream 42 passes to an input of a phase mapper 44. Those skilled in the art will appreciate that interleaver 40 is not desired in all embodiments of transmitter circuit 22, for example when convolutional encoder 36 is omitted. When interleaver 40 is omitted, encoded signal stream 38 is passed directly to the input of phase mapper 44. When both convolutional encoder 36 and interleaver 40 are omitted, binary input signal stream 34 passes directly to the input of phase mapper 44.

Figures 3, 6:
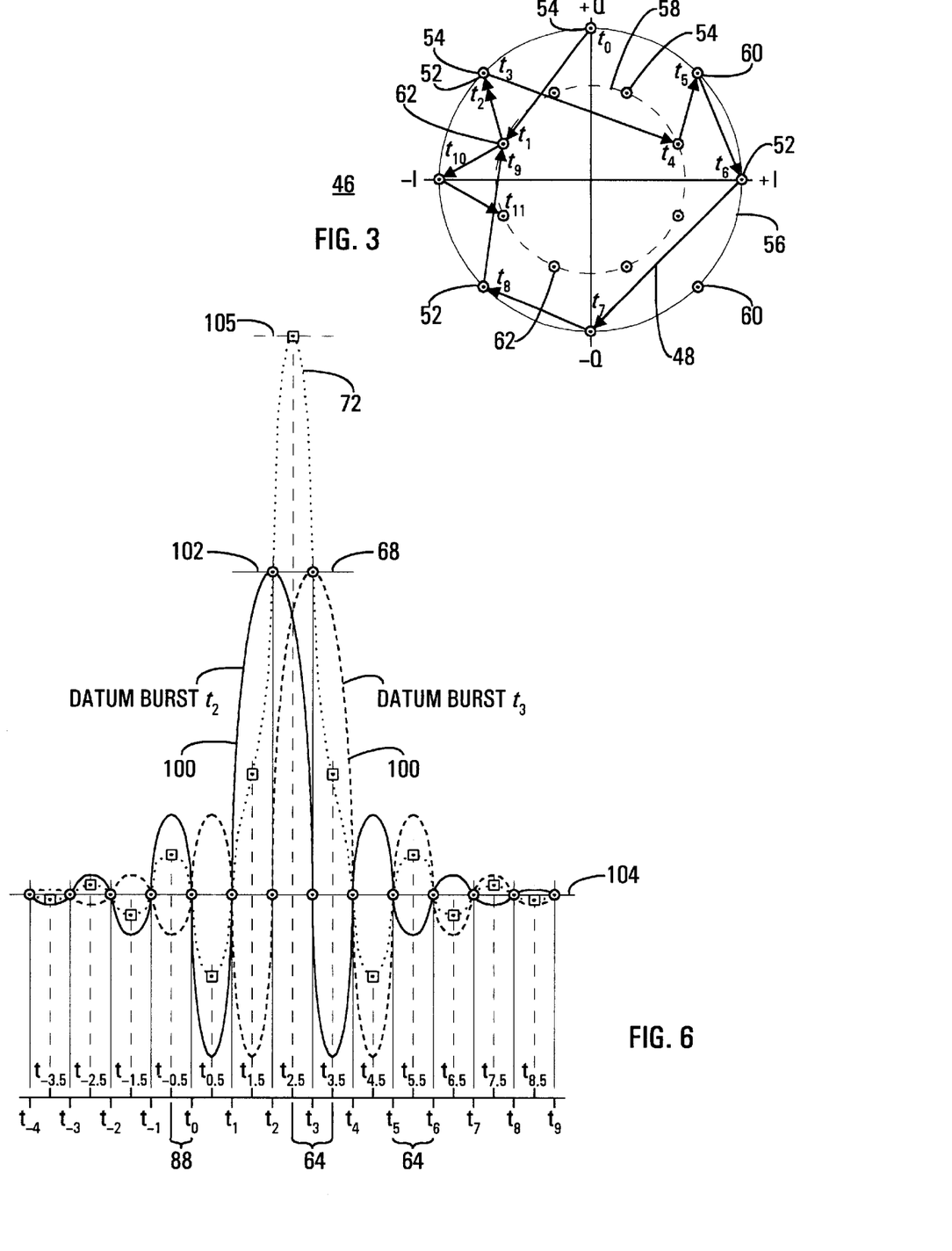
FIG. 3 depicts a 16-P-APSK constellation illustrating a locus of a quadrature phase-point signal stream over twelve exemplary consecutively mapped phase points in accordance with a preferred embodiment of the present invention.
FIG. 6 depicts a pair of Nyquist-type data bursts in accordance with a preferred embodiment of the present invention.

FIG. 3 depicts a sixteen phase-point polar amplitude and phase shift keying (16-P-APSK) constellation 46 illustrating a locus 48 of a quadrature phase-point signal stream 50 (FIG. 2) over twelve exemplary sequential phase points 52 in accordance with a preferred embodiment of the present invention. The following discussion refers to FIGS. 2 through 3.

Phase mapper 44 maps symbols (i.e., binary data units) present in interleaved signal stream 42, encoded signal stream 38, or input signal stream 34, into phase points 54 in phase-point constellation 46. While constellation 46 is depicted in FIG. 3 as a 16-P-APSK constellation, those skilled in the art will appreciate that the circuitry and methodology of the present invention may be applied to all forms of constellations. The present invention is especially beneficial when used with constellations having rings of different magnitudes, i.e., amplitude and phase-shift keying (APSK) constellations. This is true because APSK constellations, requiring amplitude modulation of the signal, desirably use linear amplifiers to reproduce that amplitude modulation.

Each phase point 54 in constellation 46 represents a plurality, in this example four, of symbols or to-be-communicated bits. The values of the symbols. in a given phase point 54 determine the location of that phase point 54 within constellation 46 in a manner well known to those skilled in the art.

Each quadrature phase point 54 may be thought of as having a vector value expressed as I,Q in the Cartesian coordinate system, where I is the in-phase (abscissa) value and Q is the quadrature (ordinate) value of the vector, or expressed as M,Φ in the polar coordinate system, where M is the magnitude and Φ is the phase angle of the vector. In this discussion, the M,Φ designation will be used throughout, as the vector magnitude is the most discussed vector component.

In the exemplary 16-P-APSK constellation 46 of FIG. 3, each phase point 54 resides upon an outer ring 56 or an inner ring 58. Phase-points 54 residing upon outer ring 56 are outer-ring or maximum-magnitude phase points 60. That is, outer-ring phase points 60 have a maximum magnitude (maximum value of M) as represented by the radius of outer ring 56. For purposes of discussion, the magnitudes of outer-ring phase points 60 are normalized to 1.00.

Inner-ring phase points 62, i.e., those phase points 54 residing upon inner ring 58, have a lesser magnitude as represented by the radius of inner ring 58. For the exemplary 16-P-APSK constellation 46 depicted in FIG. 3, the magnitudes of inner-ring phase points 62 may desirably be approximately 0.63 when outer-ring phase point 60 magnitudes are normalized to 1.00.

Figure 4:
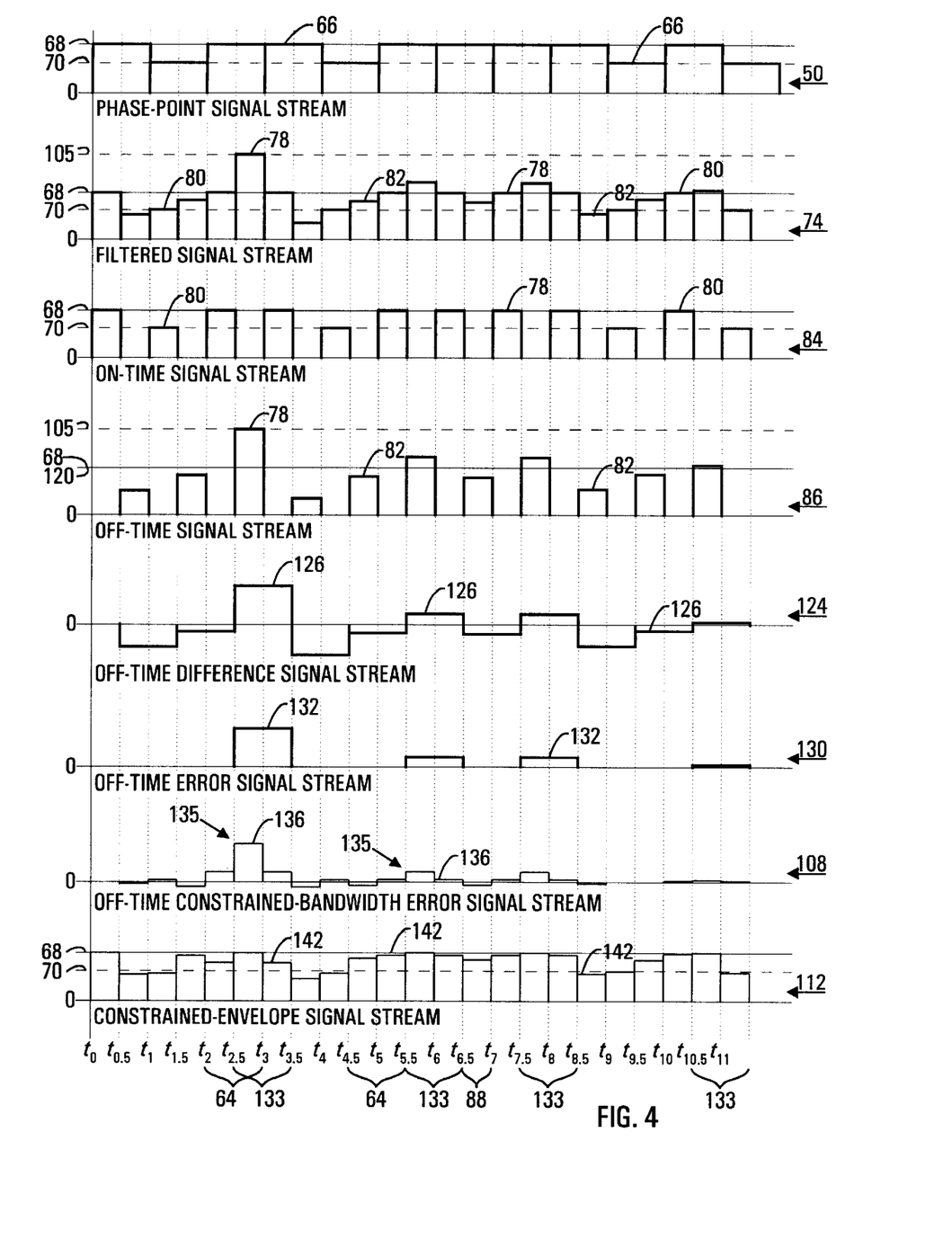
FIG. 4 depicts a plurality of signal streams in accordance with a preferred embodiment of the present invention.

FIG. 4 depicts a plurality of signal streams, in accordance with a preferred embodiment of the present invention. The following discussion refers to FIGS. 2 through 4.

The output of phase mapper 44 is phase-point signal stream 50. Phase mapper 44 processes one phase point 54 per unit interval 64. That is, phase-point signal stream 50 consists of a series of consecutive phase-point pulses 66, each of which represents one phase point 54, whose leading edges are one unit interval 64 apart. Those skilled in the art will appreciate that other embodiments of phase-point signal stream 50 are equally valid, that the embodiment utilized is dependent upon the circuitry producing and processing phase-point signal stream 50, and that the use of other embodiments of this or any other signal stream does not depart from the spirit of the present invention nor the scope of the appended claims.

FIGS. 3 and 4 illustrate a series of twelve exemplary sequential phase points 52, representative of a random data stream processed by transmitter circuit 22 (FIG. 2). These twelve exemplary phase points 52 reside at temporally consecutive locations labeled $t_0$, $t_1$, $t_2$, $t_3$, $t_4$, $t_5$, $t_6$, $t_7$, $t_8$, $t_9$, $t_{10}$, and $t_{11}$. These labels represent sequential integral times at unit intervals 64, i.e., integral-baud times, and indicate the leading-edge times of phase-point pulses 66. For purposes of simplification within this discussion, any occurrence at time $t_N$ shall be referred to as "occurrence $t_N$". For example, an exemplary phase point 52 occurring at time $t_2$ shall be referred to as phase point $t_2$, and the associated phase-point pulse 66 whose leading edge occurs at time $t_2$ shall be referred to as phase-point-signal pulse $t_2$. In other words, at time $t_2$, phase point $t_2$, is clocked and phase-point-signal pulse $t_2$ begins. One unit interval 64 later, at time $t_3$, phase point $t_3$ is clocked and phase-point pulse $t_3$ begins. This process continues indefinitely, with twelve exemplary phase points $t_0$ through $t_{11}$ depicted in FIG. 3 and twelve corresponding phase-point-signal pulses $t_0$ through $t_{11}$ depicted in phase-point signal stream 50 of FIG. 4.

Table 1 below illustrates the magnitudes for phase-point-signal pulses $t_0$ through $t_{11}$.

TABLE 1

Phase-Point Pulse Magnitudes

| Phase-Point-Signal Pulse | Magnitude |
| --- | --- |
| $t_0$ | Outer-Ring 68 |
| $t_1$ | Inner-Ring 70 |
| $t_2$ | Outer-Ring 68 |
| $t_3$ | Outer-Ring 68 |
| $t_4$ | Inner-Ring 70 |
| $t_5$ | Outer-Ring 68 |
| $t_6$ | Outer-Ring 68 |
| $t_7$ | Outer-Ring 68 |
| $t_8$ | Outer-Ring 68 |
| $t_9$ | Inner-Ring 70 |
| $t_{10}$ | Outer-Ring 68 |
| $t_{11}$ | Inner-Ring 70 |

Phase point $t_0$ is an outer-ring phase point 60. Phase-point-signal pulse $t_0$ therefore has an outer-ring magnitude 68. In like manner, phase point $t_1$ is an inner-ring phase point 62 and phase-point-signal pulse $t_1$ has an inner-ring magnitude 70.

Phase-point signal stream 50 effects locus 48 through constellation 46. Locus 48 coincides with the location of each exemplary phase point $t_0$ through $t_{11}$ in turn at unit intervals 64. In FIG. 3, locus 48 is depicted as effecting a minimum distance (straight line) path between adjacent exemplary phase points 52. Those skilled in the art will appreciate that locus 48 is so depicted solely for the sake of simplicity, and that in actual practice, locus 48 instantly jumps or snaps between exemplary phase points 52 in a discontinuous manner.

Figure 5:
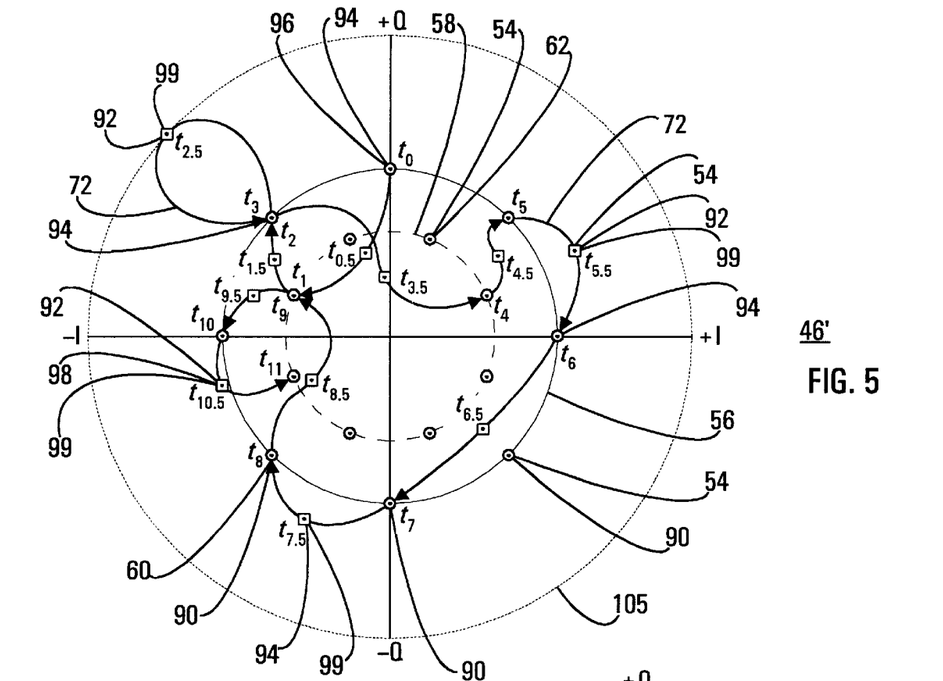
FIG. 5 depicts the phase-point constellation of FIG. 3 illustrating an exemplary locus of a filtered signal stream over the twelve consecutively mapped phase points of FIG. 3 in accordance with a preferred embodiment of the present invention.

FIG. 5 depicts an expanded phase-point constellation 46' illustrating a locus 72 of a filtered signal stream 74 (FIG. 2) over twelve exemplary sequential phase points 52 in accordance with this preferred embodiment of the present invention. The following discussion refers to FIGS. 2 through 5.

In this preferred embodiment, phase-point signal stream 50 passes to the input of a pulse-spreading filter 76, preferably realized as a Nyquist-type filter, such as a Nyquist, root-Nyquist, raised cosine-rolloff, etc., filter. Pulse-spreading filter 76 filters phase-point signal stream 50 into filtered signal stream 74, depicted in FIG. 5. In orthogonal frequency division multiplex (OFDM) systems, also known as multitone modulation (MTM) systems, pulse-spreading filter 76 may be implemented using a transmultiplexer or equivalent circuitry. Convolutional encoder 36, interleaver 40, phase mapper 44 and pulse-spreading filter 76 together form one embodiment of a modulated-signal generator 77, or more simply a modulator 77. Filtered signal stream 74 is referred to as modulated signal 74 below because it conveys the to-be-communicated data originally presented in binary input signal stream 34 (FIG. 2), albeit in a much-processed (i.e., modulated) form, at the output of modulator 77.

In accordance with Shannon's theory, well known to those skilled in the art, pulse-spreading filter 76 produces at least two (only two in this preferred embodiment) output filtered-signal pulses 78, i.e., complex samples of filtered signal stream 74, for each input phase-point pulse 66 received. This is demonstrated in FIG. 4 where filtered signal stream 74 possesses two filtered-signal pulses 78 per unit interval 64. In this preferred embodiment, filtered-signal pulses 78 consist of alternating on-time pulses 80, i.e., samples of filtered signal stream at integral unit intervals 64, and off-time pulses 82, i.e., samples of filtered signal stream 74 between integral unit intervals. In effect, filtered signal stream 74 is made up of two interleaved data streams, an on-time signal stream 84 and an off-time signal stream 86.

On-time signal stream 84 is substantially a version of phase-point signal stream 50, wherein each phase-point pulse 66 has been reduced in duration from one unit interval 64 to a half-unit interval 88 to become on-time pulse 80 while maintaining substantially the same relative leading-edge time. That is, filtered-signal pulse $t_0$ has substantially the same magnitude and substantially the same leading edge time as phase-point pulse $t_0$ with approximately one-half the duration. Of course, those skilled in the art will appreciate that signal streams 74 and 84 may be delayed from signal stream 50 by a delay imposed by filter 76.

Those skilled in the art will appreciate that on-time signal stream 84 will differ from phase-point signal stream 50 to the extent that a less than ideal, Nyquist-type filter is used for pulse-spreading filter 76. Thus, if a pure Nyquist filter is used for pulse-spreading filter 76, then on-time signal stream 84 will not differ significantly from phase-point signal stream 50. However, if a root-Nyquist or raised cosine-rolloff filter is used, then on-time signal stream 84 will exhibit a small difference, and if other types of filters are used, then a more pronounced difference may be observed.

The generation of both on-time pulses 80 and off-time pulses 82 by pulse-spreading filter 76 effectively populates expanded constellation 46' (FIG. 5) with on-time phase-points 90 (circles) and off-time phase points 92 (squares). The original phase points 54 of constellation 46 (FIG. 3), i.e., the phase points carrying the intelligence to be communicated by transmitter circuit 22, are on-time phase points 90 of expanded constellation 46'.

Added to expanded constellation 46' are off-time phase points 92, with each off-time phase-point 92 occurring approximately midway in time between consecutive on-time phase points 90. Therefore, exemplary sequential phase points 52 become exemplary filtered phase points 94. Exemplary filtered phase points 94 are made up of alternating exemplary on-time filtered phase points 96 and exemplary off-time filtered phase points 98, and reside at temporally consecutive locations labeled $t_0$, $t_{0.5}$, $t_1$, $t_{1.5}$, $t_2$, $t_{2.5}$, $t_3$, $t_{3.5}$, $t_4$, $t_{4.5}$, $t_5$, $t_{5.5}$, $t_6$, $t_{6.5}$, $t_7$, $t_{7.5}$, $t_8$, $t_{8.5}$, $t_9$, $t_{9.5}$, $t_{10}$, $t_{10.5}$, and $t_{11}$.

In FIG. 5, exemplary on-time filtered phase points 96 are located at integral-baud times ($t_0$, $t_1$, $t_2$, etc.), whereas exemplary off-time filtered phase points 98 are located at fractional-baud (non-integral-baud) times ($t_{0.5}$, $t_{1.5}$, $t_{2.5}$, etc.).

Regardless of the form in which pulse-spreading filter 76 is realized, pulse-spreading filter 76 makes a contribution to spectral containment. Essentially, pulse-spreading filter 76 spreads the energy from each phase point pulse 66 in time over many unit intervals 64 so that substantially all energy from each phase point pulse 66 remains confined within a desired bandwidth. The resulting filtered signal stream 74 thus represents the sum, at each unit interval, of portions of several phase point pulses 66 whose energy has been spread out in time over several unit intervals.

The generation of off-time phase points 92 approximately midway in time between consecutive on-time phase points 90 causes filtered signal locus 72 to effect excursions having local peak magnitudes 99 greater than outer-ring magnitude 68. Such excursions occur because the immediate position of locus 72 at any given instant in time is not only a result of those phase points 54 proximate that position, but of a plurality of phase points 54 both preceding and following that instant in time. That is, in this preferred embodiment, the determination of the position of locus 72 at time $t_{2.5}$ (i.e., coincident with off-time phase point $t_{2.5}$) is determined not only by the positions of phase points $t_2$ and $t_3$, but by the positions of numerous phase points 54 preceding phase point $t_{2.5}$ (i.e., phase points $t_2$, $t_{1.5}$, $t_1$, $t_{0.5}$, etc.) and the positions of numerous phase points 54 following phase point $t_{2.5}$ (i.e., phase points $t_3$, $t_{3.5}$, $t_4$, $t_{4.5}$, etc.).

This phenomenon is illustrated in FIG. 6, which depicts a pair of Nyquist-type datum bursts 100 in accordance with a preferred embodiment of the present invention. The following discussion refers to FIGS. 2, 4, 5, and 6.

In this preferred embodiment, pulse-spreading filter 76 is realized as a Nyquist-type filter. Therefore, when a single phase-point pulse 66 is filtered by pulse-spreading filter 76, that single pulse 66 is transformed into a Nyquist-type datum burst 100 extending over a plurality of unit intervals 64. It is a property of Nyquist-type filters that datum burst 100 attains a datum-burst peak value 102 (i.e., a local peak magnitude) at the primary sampling time of the specific phase-point pulse 66 (i.e., at time $t_2$ for phase-point pulse $t_2$), and attains a near zero datum-burst value 104 (i.e., is nearly equal to zero) at integral unit intervals 64 preceding and following peak datum-burst value 102 (i.e., at times . . . , $t_{-1}$, $t_0$, $t_1$, and $t_3$, $t_4$, $t_5$, . . . , for phase-point pulse $t_2$). In this manner, the energy of each pulse 78 is spread over a plurality of baud intervals 64 preceding and following the clocking instant (time $t_2$).

FIG. 6 illustrates Nyquist-type datum bursts 100 for phase-point pulses $t_2$ and $t_3$, with datum burst $t_2$ depicted as a solid line and datum burst $t_3$ depicted as a dashed line. As an example, it may be seen from FIG. 6 that at time $t_2$ the value of datum burst $t_2$ is peak datum-burst value 102. At every other time separated from time $t_2$ by an integral number of unit intervals 64, the value of datum burst $t_2$ is substantially zero. An analogous condition occurs for datum burst $t_3$.

The value of locus 72 is, at each moment in time, the sum of all datum bursts 100 at that moment. In the simplified two-datum-burst example of FIG. 6, locus 72, depicted by a dotted line, is the sum of datum burst $t_2$ and datum burst $t_3$. Since datum bursts $t_2$ and $t_3$ are about zero at each integral time $t_N$ except times $t_2$ and $t_3$, the value of locus 72 is also about zero except at times $t_2$ and $t_3$, where it assumes the peak values of datum bursts $t_2$ and $t_3$, respectively.

The value of locus 72 at any instant in time between integral-baud times is the sum of the values of all datum bursts 100 at that instant. For example, in FIG. 6 where only two datum bursts 100 are considered, locus 72 has a value at time $t_{2.5}$ that is the sum of the values of datum bursts $t_2$ and $t_3$ at time $t_{25}$. Since datum bursts $t_2$ and $t_3$ both have significant positive values at time $t_{2.5}$, locus 72 has a value significantly greater than the maximum values of either datum burst $t_2$ or datum burst $t_3$.

Since locus 72 describes the sum of all datum bursts 100, locus 72 is a function of the shape of the curves (FIG. 6) describing those datum bursts 100. That is, locus 72 is a function of a filtered-signal peak magnitude component of a filtered-signal complex digital value at any given point. The shape of the datum-burst curve is a function of the excess bandwidth factor, $\alpha$, a design property of pulse-spreading filter 76. The smaller the value of $\alpha$, the more locus 72 may rise above the peak datum burst values 102 of adjacent datum bursts 100. Typical designs of pulse-spreading filters 76 use $\alpha$ values of 0.10 to 0.5. For like-valued adjacent phase points 54 and an $\alpha$ value of 0.2, a maximum excursion magnitude 105 (i.e., the potential local peak magnitude 99 of locus 72) is approximately 1.8 times the value of the maximum phase-point magnitude. That is, the magnitude of the constrained envelope is approximately 1.8 times that of the unconstrained envelope.

In this preferred embodiment depicted in FIGS. 3, 4, and 6, on-time phase points $t_2$ and $t_3$ are both outer-ring phase points 60 having a normalized outer-ring magnitude 68 of 1.00. Therefore, off-time phase point $t_{2.5}$ may have a normalized maximum excursion magnitude 105 of 1.8. This implies that transmitter circuit 22, to faithfully transmit phase point $t_{2.5}$ without excessive distortion, and without the benefit of the present invention, would require an output power of 3.24 ($1.8^2$) times the power required to transmit phase point $t_2$ or $t_3$, which are representative of the highest magnitude intelligence-carrying phase points 54. In other words, the peak-to-average power ratio characteristic of signal stream 74 is relatively high, and components downstream of modulator 77, such as a power amplifier, would, without the benefit of further processing discussed below, need to be configured to accommodate this relatively high peak-to-average power ratio characteristic. However, such configuration would represent an inefficient use of available power.

The following discussion refers to FIGS. 2, 4, and 5.

Off-time signal stream 86, a portion of filtered signal stream 74, (also referred to as modulated signal 74 below) passes from an output of modulator 77 to an input of an off-time constrained-envelope generator 106. It is the task of off-time constrained-envelope generator 106 to produce an off-time constrained-bandwidth error signal stream 108 from off-time signal stream 86. A complex summing or combining circuit 110 combines off-time constrained-bandwidth error signal stream 108 with a delayed version of filtered signal stream 74 (discussed below) to produce a constrained-envelope signal stream 112, which is an altered version of modulated signal 74. Constrained-envelope signal stream 112 is effectively modulated signal 74 with compensation for excursions of locus 72 with magnitudes greater than outer-ring magnitude 68. As a result, constrained-envelope signal stream 112, (also referred to as altered modulated signal 112 below) exhibits a relatively low peak-to-average power ratio characteristic more easily accommodated by downstream components.

A quadrature threshold generator 118 generates a quadrature threshold signal 120. In this preferred embodiment, threshold signal 120 is a steady-state, constant signal having a value approximately equal to outer-ring magnitude 68. Threshold signal 120 is used to establish a reference with which off-time signal stream 86 is compared. Those skilled in the art will appreciate that threshold signal 120 may assume many forms and values in keeping with the methodology and circuitry incorporated in the comparison. The use of other forms and/or other values does not depart from the spirit of the present invention nor from the scope of the appended claims.

Threshold signal 120 and off-time signal stream 86 are combined in an off-time complex summing or combining circuit 122 to produce an off-time difference signal stream 124. Off-time difference signal stream 124 is made up of a series of off-time difference pulses 126 whose values are the difference between the values of equivalent off-time pulses. 82 and the value of threshold signal 120. Since any given off-time pulse 82 may have a value greater than, equal to, or less than the value of threshold signal 120, off-time difference signal stream 124 would normally be made up of a combination of off-time difference pulses 126 having positive, zero, and negative values.

Off-time difference signal stream 124 is passed to the input of an off-time discriminator 128 to produce an off-time error signal stream 130. In this preferred embodiment, off-time error signal stream 130 is a variation of off-time difference signal stream 124 in which all off-time difference pulses 126 having positive values are passed unchanged as off-time error pulses 132 while all other off-time difference pulses 126 are passed as zero-value pulses (i.e., eliminated). In other words, off-time discriminator 128 acts as a pulse generator. Off-time error signal stream 130 is formed from error pulses 132, the timing of which coincide with excursions of locus 72 beyond outer-ring magnitude 68 and the magnitudes of which correspond to the degree to which locus 72 passes beyond the threshold value set by threshold generator 118. The unit intervals 64 for which off-time error signal stream 130 provides off-time error pulses 132 are referred to as peaking unit intervals 133 below.

Off-time error signal stream 130 is then passed to the input of an off-time pulse-spreading filter 134. Off-time pulse-spreading filter 134 is desirably substantially identical to first pulse-spreading filter 76. That is, in this preferred embodiment, both pulse-spreading filters 76 and 134 are realized as Nyquist-type filters with substantially identical transfer characteristics. However, in other applications, such as an OFDM application, non-identical pulse-spreading filters 76 and 134 may be. advantageous. Off-time pulse-spreading filter 134 produces off-time constrained-bandwidth error signal stream 108 and completes the action of off-time constrained-envelope generator 106.

Like pulse-spreading filter 76, pulse-spreading filter 134 is configured to achieve spectral containment goals. Essentially, pulse-spreading filter 134 spreads the energy from each off-time error pulse 132 in time over many unit intervals 64 so that substantially all energy from each off-time error pulse 132 remains confined within the desired bandwidth, normally substantially the same bandwidth for which pulse-spreading filter 76 is designed. The resulting constrained-bandwidth error signal stream 108 thus represents the sum, at each unit interval 64, of portions of several off-time error pulses 132 whose energy has been spread out in time over several unit intervals 64. No harm to spectral containment would result if off-time constrained-bandwidth error signal stream 108 were to exhibit a more narrow bandwidth than modulated signal 74. However, increasing harm to spectral containment results as off-time constrained-bandwidth error signal stream. 108 exhibits an increasingly wider bandwidth than modulated signal 74. Thus, off-time constrained-bandwidth error signal stream 108 desirably exhibits a bandwidth substantially equal to or less than the bandwidth exhibited by modulated signal 74.

Within off-time constrained-envelope generator 106, off-time pulse-spreading filter 134 receives one off-time error pulse 132 from off-time discriminator 128 for each peaking unit interval 133. Off-time pulse-spreading filter 134 then transforms each off-time error pulse 132 into a Nyquist-type error burst 135, which has substantially the same shape as datum bursts 100 (FIG. 6). Each error burst 135 spreads energy over a plurality of unit intervals 64 and exhibits a Delay element 138 delays modulated signal 74 so that peaks in one unit interval 64. Peaks of error bursts 135 substantially temporally coincide with peaking unit intervals 133. Since off-time pulse-spreading filter 134 is a Nyquist-type filter, each error burst attains an error-burst peak value (not shown) at the primary sampling time of the specific off-time error pulse 132 (i.e., at time $t_{2.5}$ for error pulse $t_{2.5}$), and attains a zero error-burst value (not shown) at integral unit intervals 64 preceding and following the peak error-burst value (i.e., at times . . . , $t_{-1.5}$, $t_{0.5}$, $t_{1.5}$, and $t_{3.5}$, $t_{4.5}$, $t_{5.5}$, . . . , for error pulse $t_{2.5}$). In this manner, the energy of each off-time constrained-envelope error pulse 136 is spread over a plurality of baud intervals 64 preceding and following the clocking instant (time $t_{2.5}$). This results in the conversion of off-time error signal stream 130 into off-time constrained-bandwidth error signal stream 108. Off-time constrained-bandwidth error signal stream 108 is made up of off-time constrained-envelope error pulses 136 having peaks responsive to amounts or values by which magnitudes of said modulated signal 74 exceed said threshold 120. This operation is essentially the same as the operation of pulse-spreading filter 76 in the conversion of phase-point signal stream 50 into modulated signal 74 described hereinabove.

Since off-time constrained-envelope error pulses 136 are derived from off-time pulses 82, the error-burst peak and zero values occur approximately midway between integral baud times, i.e., at baud times $t_{0.5}$, $t_{1.5}$, $t_{2.5}$, etc., hence between datum-burst peak and zero values 102 and 104 of filtered signal stream 74.

The production of off-time constrained-bandwidth error signal stream 108 completes the operation of off-time constrained envelope generator 106.

Modulated signal 74 is also passed to the input of a delay element 138. Delay element 138 produces delayed modulated signal 140, which is effectively modulated signal 74 delayed sufficiently to compensate for the propagation and other delays encountered in off-time constrained-envelope generator 106, and particularly in off-time pulse-spreading filter 134. In other words, delayed modulated signal 140 is modulated signal 74 delayed into synchronism with off-time constrained-bandwidth error signal stream 108.

Combining circuit 110 combines modulated signal 74, in the form of delayed modulated signal 140, and off-time constrained-bandwidth error signal stream 108 to reduce peak magnitude components of modulated signal 74. The resultant altered modulated signal 112 is made up of a series of digital pulses 142 in this embodiment whose values are the difference between the values of corresponding filtered-signal pulses 78 and off-time constrained-envelope error pulses 136. The result is a series of digital pulses 142 whose values do not appreciably exceed outer-ring magnitude 68 of expanded constellation 46'. At the same time, the bandwidth of modulated signal 74 is maintained in altered modulated signal 112.

In some embodiments of the present invention, certain of outer-ring phase points 60 may have magnitudes greater than outer-ring magnitude 68, i.e., may be located beyond outer ring 56. This condition may occur as a result of pulse-spreading filter 76 executing certain Nyquist-type or other filtering functions well known to those skilled in the art. In such an embodiment, transmitter circuit 22 contains an on-time constrained envelope generator 106' in addition to off-time constrained-envelope generator 106 discussed above.

On-time signal stream 84, also a portion of modulated signal 74, passes from an output of modulator 77 to an input of on-time constrained-envelope generator 106'. It is the task of on-time constrained-envelope generator 106' to produce an on-time constrained-bandwidth error signal stream 108' from on-time signal stream 84. Combining circuit 110 combines both off-time and on-time constrained-bandwidth error signal streams 108 and 108' with delayed modulated signal 140 (discussed below) to produce altered modulated signal 112.

On-time constrained-envelope generator 106' operates in a manner analogous with the operation of off-time constrained-envelope generator 106. Threshold signal 120 and on-time signal stream 84 are combined in an on-time complex summing or combining circuit 122' to produce an on-time difference signal stream 124'. On-time difference signal stream 124' is passed to the input of an on-time discriminator 128' to produce an on-time error signal stream 130'. On-time error signal stream 130' is then passed to the input of an on-time pulse-spreading filter 134', which produces on-time constrained bandwidth error signal stream 108'. Like off-time pulse-spreading filter 134, on-time pulse-spreading filter 134', may be substantially identical to first pulse-spreading filter 76.

Since on-time constrained-envelope error pulses (not shown) are derived from on-time pulses 80, the error-burst peak and zero values occur at integral baud times, i.e., at baud times $t_1$, $t_2$, $t_3$, etc., hence between datum-burst peak and zero values 102 and 104 of modulated signal 74.

Combining circuit 110 combines filtered signal stream 74, in the form of delayed modulated signal 140, with both off-time and on-time constrained-bandwidth error signal stream 108 and 108' to reduce peak magnitude components of filtered signal stream 74 without substantially increasing the bandwidth of modulated signal 74.

Figure 7:
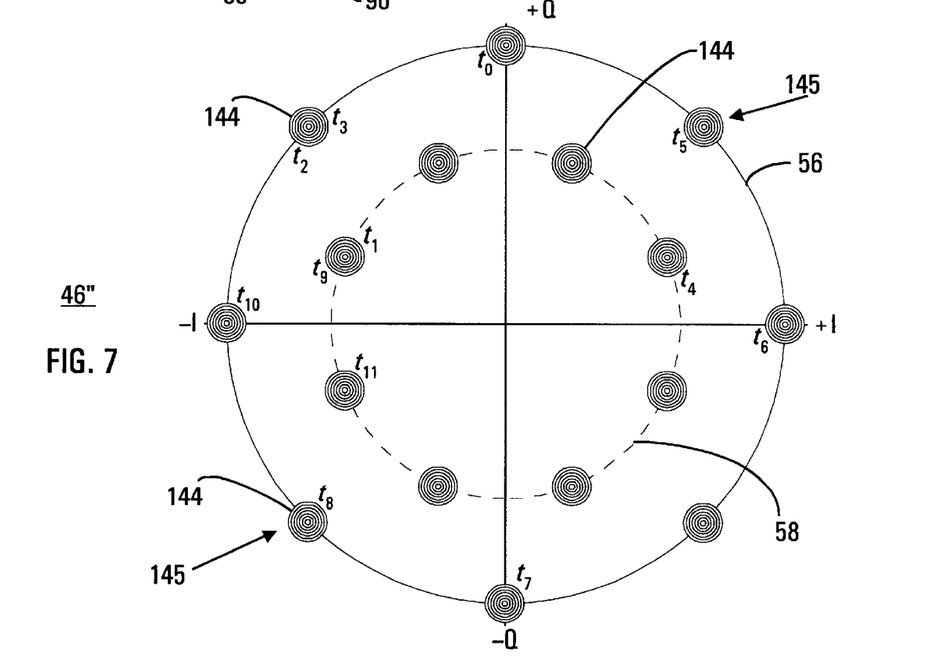
FIG. 7 depicts a noise-influenced constellation illustrating constrained-envelope phase-point probabilities of the phase points of the constellation of FIG. 3 in accordance with a preferred embodiment of the present invention.

A side effect of this methodology is that locus 72 at integral unit intervals 64 adds a signal-dependent, baud-limited noise factor to the positions of phase points 54 in constellation 46 (FIG. 3). This results in transmitter circuit 22 transmitting a "noise-influenced" phase-point constellation 46". In FIG. 7, noise-influenced constellation 46" is depicted illustrating constrained-envelope phase-point probabilities 144 of phase points 54 in accordance with a preferred embodiment of the present invention. The following discussion refers to FIG. 2, 3, 5 and 7.

Phase-point probabilities 144 reside in noise-influenced constellation 46" exactly as phase points 54 reside in constellation 46, i.e., in the same configuration with centers at the same locations. The actual location of a given transmitted phase point 145 within a given phase-point probability 144 is a function of a plurality of variable conditions and, although somewhat correlated, except in certain specialized cases, cannot readily be predicted. In effect, for a given phase point 54, the resultant transmitted phase point 145 may be located anywhere within phase-point probability 144, i.e., within an indeterminate area having a center coincident with the location of the original phase point 54.

The probability of transmitted phase point 145 being located at any specific position within that indeterminate area varies as an inverse function of the distance of that specific position from the location of the original phase point 54.

For any given phase point 54, the transmitted phase point 145 may be said to be proximate its idealized position within noise-influenced constellation 46". That is, a locus (not shown) of constrained-envelope signal stream 112 passes proximate the idealized positions of exemplary phase points $t_0$, $t_1$, $t_2$, etc., at the clocking instants in time.

The original phase points 54 of constellation 46, as produced by phase mapper 44, are on-time phase points 90 (circles) of expanded constellation 46'. It is these on-time phase points 90 that carry the intelligence of RF broadcast signal 26 as ultimately transmitted. Off-time phase points 92 (squares) are by-products of pulse-spreading filter 76, required to constrain spectral regrowth rather than to carry intelligence. Phase-point probabilities 144 of noise-influenced constellation 46" represent the resultant areas of probable locations of transmitted phase points 145 as derived from on-time phase points 90. The centers of phase-point probabilities 144 occupy the same normalized locations within noise-influenced constellation 46" as do on-time phase points 90 within expanded constellation 46'.

The positional aberrations of transmitted phase points 145 relative to the corresponding on-time phase points 90 represent a degree of positional error. This positional error degrades the bit error rate and effects a detriment to transmission. The absence of off-time phase points 92 with a magnitude significantly greater than outer-ring magnitude 68 (FIG. 4) in constrained-envelope signal stream 112, however, allows an increase in power output for a given bandwidth and power amplifier that more than compensates for the position error of transmitted phase points 145. A net improvement in performance results.

In order to minimize any detrimental effect while achieving a desired target peak-to-average power ratio and bandwidth, (i.e., to optimize performance) those skilled in the art may modify the above-discussed embodiment in a variety of ways. For example, in one alternate preferred embodiment, off-time and on-time error signal streams 130 and 130' may be routed through respective on-time and off-time multiplying sections (not shown) before being applied to pulse-spreading filters 134 and 134'. Such multiplying sections scale magnitudes of error pulses 132 and the resulting error bursts 135 to one another so that a more precisely configured constrained-bandwidth error signal 108 is formed.

In another alternate embodiment which seeks to optimize performance, modulated signal 74 may be broken into more than the off-time and on-time signal streams 86 and 84 discussed above. In one example, four streams may provide samples for $t_{N.00}$, $t_{N.25}$, $t_{N.50}$ and $t_{N.75}$ instants of each unit interval, where N is a unit interval number. Interpolators (not shown) may be used to expand the off-time and on-time signal streams 86 and 84 into four streams. Each of the four streams may be processed through its own con strained-envelop generator 106. As discussed above, the four error signal streams 130 may be scaled relative to each other through the addition of multiplying sections (not shown) upstream of pulse-spreading filters 134. In one embodiment, in order to reduce the amount of hardware needed to implement pulse-spreading filters 134, four streams are generated, but only two pulse-spreading filters 134 are used. In this embodiment, the relative scaling applied to off-time and on-time error signal streams 130 and 130' is dynamically adjusted on a unit interval by unit interval basis in response to where among the four streams a signal peak occurs. These and other changes and modifications to the above-described embodiments do not depart from the spirit of the invention.

Referring back to FIG. 2, the output of combining circuit 110, altered modulated signal 112, is passed to an input of a substantially linear amplifier 146. Substantially linear amplifier 146 produces RF broadcast signal 26, which is then broadcast via transmitter antenna 24. In the preferred embodiment, substantially linear amplifier 146 is made up of a digital linearizer 148, a digital-to-analog converter 150, and a radio-frequency (RF) amplifying circuit 152. Those skilled in the art will appreciate that substantially linear amplifier 146 may be realized in any of a plurality of different embodiments other than that described here, and that utilization of any of these different embodiments does not depart from the intent of the present invention nor the scope of the appended claims.

Within substantially linear amplifier 146, digital linearizer 148 alters constrained-envelope signal stream 112 into a pre-distorted digital signal stream 154. Pre-distorted digital signal stream 154 is made non-linear in just the right manner to compensate for non-linearities within digital-to-analog converter 150 and RF amplifying circuit 152, hence linearizing substantially linear amplifier 146.

Digital-to-analog converter 150 then converts pre-distorted digital signal stream 154 into an analog baseband signal 156. Analog baseband signal 156 is then amplified by RF amplifying circuit 152 into RF broadcast signal 26 and transmitted via transmitter antenna 24. Due to the combination of constrained error signals 108 with modulated signal 74, substantially linear amplifier 146 need not process as great a peak-to-average power ratio as would be required if constrained error signals 108 were not used. At the same time, constrained error signals 108 are configured so as to substantially prevent the bandwidth of modulated signal 74 from increasing.

Figure 8:
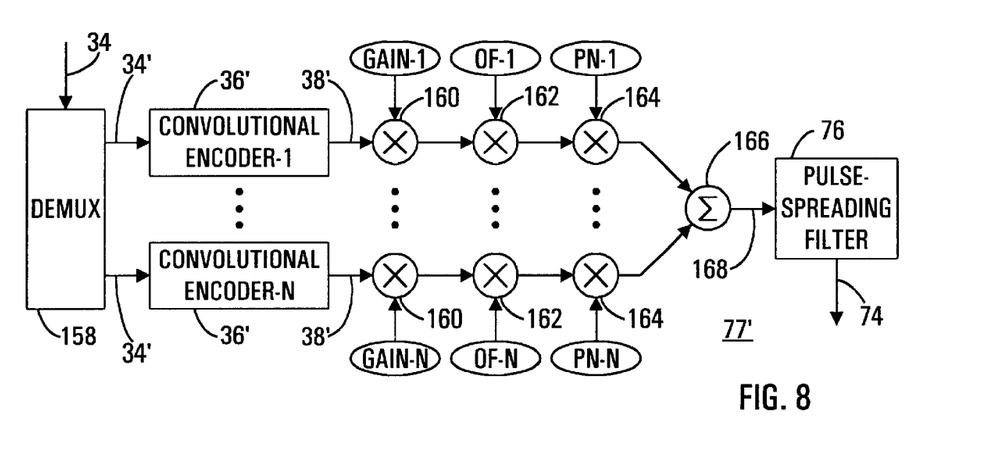
FIG. 8 depicts a block diagram of a CDMA modulated-signal generator configured in accordance with one preferred embodiment of the present invention.

FIG. 8 depicts a block diagram of a CDMA modulated-signal generator 77' configured in accordance with another preferred embodiment of the present invention. In this CDMA embodiment of the present invention, CDMA modulated-signal generator 77' may be substituted for modulator 77, shown in FIG. 2.

When communication system 20 (FIG. 1) is configured to implements a CDMA communication scheme, a similar concern to that described above may occur. Namely, without further processing, a linear amplifying circuit may need to amplify a signal exhibiting an undesirably high peak-to-average power ratio characteristic. High peak-to-average power ratios are particularly likely to be experienced at the types of hubs or base stations where many code-channels are combined together for amplification in a single amplifying circuit.

Referring to FIGS. 2 and 8, binary data source 32 again provides binary input signal stream 34 of to-be-communicated data. In this CDMA embodiment, binary input signal stream 34 includes data to be transmitted through a number of different CDMA code-channels. Binary input signal stream 34 is provided to a demultiplexer (DEMUX) 158, which parses input signal stream 34 into a quantity N, where N represents the number of independent code-channels provided by modulator 77', code-channel signal streams 34'. The N code-channel signal streams 34' are respectively routed to N convolutional encoders 36', which generate N encoded signal streams 38'. Although not shown, interleavers may be inserted at this point in the signal flow. Each of the N encoded signal streams 38' is routed through respective multiplication stages 160, 162 and 164.

Multiplication stage 160 allows the application of scale factors that adjust the relative gain of each code-channel for the purposes of power control. Multiplication stage 162 may be effected by a modulo-2 addition and allows the application of an orthogonal function (OF) (e.g., a Walsh or Hadamard code). Multiplication stage 164 applies various pseudo-noise (PN) codes on a unit chip interval basis to spread the code-channels in a well-known manner. Multiplication stage 164 may also be effected by a modulo-2 addition.

After stages 160, 162 and 164, the N code-channels are summed together on a unit interval by unit interval basis in an adding stage 166 to form composite signal stream 168. Those skilled in the art will appreciate that in this CDMA embodiment, the unit intervals discussed above are equivalent to chip intervals here. Moreover, in many of the unit chip intervals, the signals from many of the different code-channels will cancel each other out. Thus, composite signal stream 168 will have a modest average power level. However, in rare circumstances, unit chip intervals will occur in which the values for the N code-channels tend to add together with very little or no canceling. In these infrequent circumstances composite signal stream 168 will exhibit a peak level which far exceeds the average level. Consequently, composite signal stream 168 exhibits a high peak-to-average power ratio.

Composite signal stream 168 is routed to pulse-spreading filter 76 which operates at the unit chip interval rate. As with the above-discussed embodiment, pulse-spreading filter 76 is desirably implemented as a Nyquist-type filter because such filters approach near-ideal conditions by spreading pulse energy over many unit intervals to constrain the resulting modulated signal 74 to a predetermined bandwidth without unduly contributing to inter-chip or inter-symbol interference, but this is not a requirement. In this CDMA embodiment, composite signal stream 168, which already exhibits a high peak-to-average power ratio, is filtered in a manner which exacerbates the already high peak-to-average power ratio.

As discussed above, modulated signal 74 includes off-time and on-time signal streams 86 and 84 (FIG. 4) which are routed to off-time and on-time constrained-envelope generators 106 and optionally 106' to generate constrained error signals 108 as discussed above for combining with delayed modulated signal 140 to reduce the infrequent peaks without significantly increasing bandwidth. Constrained-envelope generators 106 operate at the unit chip interval rate. In this CDMA embodiment, any convenient threshold that achieves results in an altered modulated signal 112 easily amplified by substantially linear amplifier 146 without too severely increasing distortion may be generated by threshold generator 118.

Thus, in the CDMA embodiment modulated signal 74 exhibits a desired predetermined bandwidth due, at least in part, to the operation of pulse-spreading filter 76. As with the previous embodiment, modulated signal 74 exhibits an undesirably high peak-to-average power ratio. However, in the CDMA embodiment the undesirably high peak-to-average power ratio results from combining the numerous code-channels and from the operation of pulse-spreading filter 76. Regardless of the cause, peaks are identified in constrained envelope generators 106 and reduced by the application of error bursts 135 (FIG. 4) constructed in signal shape to exhibit substantially the same bandwidth as is exhibited by modulated signal 74, or a smaller bandwidth, and constructed in time and magnitude to diminish peaks to more acceptable levels.

The distortion discussed above in connection with FIG. 7 poses even less of a detriment in the CDMA embodiment. The noise induced by the infrequent peak-reduction error bursts 135 is spread in a CDMA receiver circuit 30 (FIG. 1) so as to be distributed over the entire wide bandwidth shared by all code-channels. Consequently, for any single code-channel the noise of constrained-envelope error signals 108 remains well below the noise floor caused by all other code-channels.

In summary, the present invention provides an improved constrained-envelope transmitter and method therefor. A constrained-envelope generator is provided to generate a signal which, when combined with a modulated signal that exhibits a predetermined bandwidth, reduces peak-to-average power ratio without increasing the predetermined bandwidth. The modulated signal typically exhibits a desired bandwidth but undesirably large peak-to-average power ratio. However, it is adjusted to lessen the peak-to-average power ratio without increasing bandwidth. In one embodiment, a CDMA modulator provides a modulation signal that is a composite of many code-channels and exhibits an undesirably high peak-to-average power ratio. The composite modulation signal is adjusted so that the adjusted signal may be faithfully amplified by a relatively inexpensive power amplifier otherwise incapable of faithfully reproducing the undesirably high peak-to-average power ratio.

Although the preferred embodiments of the invention have been illustrated and described in detail, it will be readily apparent to those skilled in the art that various modifications may be made therein without departing from the spirit of the invention or from the scope of the appended claims. For example, the present invention may be adapted to many types of modulations. Moreover, while the above-discussed preferred embodiments discuss generating digital constrained-envelope error signals which are added to digital modulated signals, those skilled in the art can readily adapt the teaching of the present invention to analog signals. These and other changes and modifications are intended to be included in the scope of the claims.

What is claimed is:

1. A constrained-envelope digital communications transmitter circuit comprising:
    a modulated-signal generator for generating a first modulated signal conveying to-be-communicated data, having a first bandwidth and having a first peak-to-average amplitude ratio;
    a constrained-envelope generator for generating a constrained bandwidth error signal in response to said first modulated signal;
    a combining circuit for combining said constrained bandwidth error signal with said first modulated signal to produce a second modulated signal conveying said to-be-communicated data, said second modulated signal having substantially said first bandwidth and a second peak-to-average amplitude ratio, said second peak-to-average amplitude ratio being less than said first peak-to-average amplitude ratio; and
    a substantially linear amplifier configured to amplify said second modulated signal.

2. A constrained-envelope digital communications transmitter circuit as claimed in claim 1 additionally comprising a delay element coupled between said modulated-signal generator and said combining circuit to delay said first modulated signal into synchronism with said constrained bandwidth error signal.

3. A constrained-envelope digital communications transmitter circuit as claimed in claim 2, wherein said constrained-envelope generator is configured so that said constrained bandwidth error signal exhibits a bandwidth substantially equal to or less than said first bandwidth.

4. A constrained-envelope digital communications transmitter circuit as claimed in claim 2 wherein:

peaking unit intervals occur when said first modulated signal exhibits magnitudes greater than a threshold;

said constrained bandwidth error signal includes error bursts for said peaking unit intervals, wherein each error burst spreads energy over a plurality of unit intervals and exhibits a peak in one unit interval; and said delay element delays said first modulated signal so that error burst peaks substantially temporally coincide with said peaking unit intervals.

5. A constrained-envelope digital communications transmitter circuit as claimed in claim 4 wherein said error burst peaks exhibit amplitudes which are responsive to amounts by which magnitudes of said first modulated signal exceed said threshold.

6. A constrained envelope digital communications transmitter circuit as claimed in claim 1 wherein said modulated-signal generator is a code division multiple access (CDMA) modulator and said first modulated signal conveys a plurality of code-channels of said to-be-communicated data.

7. A constrained-envelope digital communications transmitter circuit as claimed in claim 6 wherein said CDMA modulator includes a Nyquist-type pulse spreading filter which provides said first modulated signal.

8. A constrained-envelope digital communications transmitter circuit as claimed in claim 1 wherein said constrained-envelope generator comprises:

a pulse generator responsive to said first modulated signal; and a filter having an input coupled to said pulse generator and being configured to generate said constrained bandwidth error signal.

9. A constrained-envelope digital communications transmitter circuit as claimed in claim 8 wherein said pulse generator is configured to generate a pulse when said first modulated signal exhibits a magnitude greater than a threshold.

10. A constrained-envelope digital communications transmitter circuit as claimed in claim 9 wherein said pulse generator is further configured so that said pulse exhibits an amplitude which is responsive to a value by which said first modulated signal exhibits said magnitude greater than said threshold.

11. A constrained-envelope digital communications transmitter circuit as claimed in claim 1 wherein said substantially linear amplifier comprises:

a linearizer configured to pre-distort said second modulated signal into a pre-distorted signal; and a radio-frequency amplifying circuit configured to generate a radio-frequency broadcast signal from said pre-distorted signal.

12. In a digital communications system, a method for transmitting a constrained-envelope communications signal comprising:

generating a first modulated signal conveying to-be-communicated data and having a first bandwidth and a first peak-to-average amplitude ratio;

generating a constrained bandwidth error signal in response to said first modulated signal;

combining said constrained bandwidth error signal with said first modulated signal to produce a second modulated signal conveying said to-be-communicated data, said second modulated signal having substantially said first bandwidth and a second peak-to-average amplitude ratio, said second peak-to-average amplitude ratio being less than said first peak-to-average amplitude ratio; and linearly amplifying said second modulated signal.

13. A method as claimed in claim 12 wherein said constrained bandwidth error signal exhibits a bandwidth substantially equal to or less than said first bandwidth.

14. A method as claimed in claim 13 additionally comprising delaying said first modulated signal into synchronism with said constrained bandwidth error signal.

15. A method as claimed in claim 14 wherein:

peaking unit intervals occur when said first modulated signal exhibits magnitudes greater than a threshold;

said constrained bandwidth error signal includes error bursts for said peaking unit intervals, wherein each error burst spreads energy over a plurality of unit intervals and exhibits a peak in one unit interval; and said first modulated signal is delayed so that error burst peaks substantially temporally coincide with said peaking unit intervals.

16. A method as claimed in claim 15 additionally comprising forming said constrained bandwidth error signal so that said error burst peaks exhibit amplitudes which are responsive to amounts by which magnitudes of said first modulated signal exceed said threshold.

17. A method as claimed in claim 12 wherein said first-modulated-signal-generating activity configures said first modulated signal as a code division multiple access (CDMA) signal conveying a plurality of code-channels of said to-be-communicated data.

18. A constrained-envelope digital communications transmitter circuit comprising:

a modulated-signal generator for generating a first modulated signal conveying to-be-communicated data, having a first bandwidth and having a first peak-to-average amplitude ratio;

a constrained-envelope generator for generating a constrained bandwidth error signal in response to said first modulated signal, said constrained bandwidth error signal exhibiting a bandwidth substantially equal to or less than said first bandwidth, and said constrained bandwidth error signal exhibiting peak amplitudes which are responsive to amounts by which magnitudes of said first modulated signal exceed a threshold;

a delay element for delaying said first modulated signal into synchronism with said constrained bandwidth error signal;

a combining circuit for combining said constrained bandwidth error signal with said first modulated signal to produce a second modulated signal conveying said to-be-communicated data, said second modulated signal having substantially said first bandwidth and a second peak-to-average amplitude ratio, said second peak-to-average amplitude ratio being less than said first peak-to-average amplitude ratio; and a substantially linear amplifier configured to amplify said second modulated signal.

19. A constrained-envelope digital communications transmitter circuit as claimed in claim 18 wherein said modulated-signal generator is a code division multiple access (CDMA) modulator and said first modulated signal conveys a plurality of code-channels of said to-be-communicated data.

20. A constrained-envelope digital communications transmitter circuit as claimed in claim 18 wherein:

peaking unit intervals occur when said first modulated signal exhibits magnitudes greater than said threshold;

said constrained bandwidth error signal includes error bursts for said peaking unit intervals, wherein each error burst spreads energy over a plurality of unit intervals and exhibits a peak in one unit interval; and said delay element delays said first modulated signal so that error burst peaks substantially temporally coincide with said peaking unit intervals.

* * * * *

UNITED STATES PATENT AND TRADEMARK OFFICE
CERTIFICATE OF CORRECTION

PATENT NO.     : 6,366,619 B1
DATED          : April 2, 2002
INVENTOR(S)    : McCallister et al.

It is certified that error appears in the above-identified patent and that said Letters Patent is hereby corrected as shown below:

Column 1,
Line 54, replace "Nyquist-a type" with -- Nyquist-type --.

Column 5,
Line 26, delete the "." after "symbols".

Column 6,
Line 18, delete the "," after the second "$t_2$".

Column 8,
Line 28, replace "$t_{25}$" with -- $t_{2.5}$ --.

Column 9,
Line 6, replace "$t_{25}$" with -- $t_{2.5}$ --.

Column 10,
Line 16, delete the "." after "pulses".
Line 48, delete the "." after "be".

Column 11,
Line 1, delete the "." after "system".
Line 14, replace "Delay element 138 delays modulated signal 74 so that peaks" with -- peak --.
Line 15, replace "Peaks" with -- Delay element 138 delays modulated signal 74 so that peaks --.

UNITED STATES PATENT AND TRADEMARK OFFICE
CERTIFICATE OF CORRECTION

PATENT NO.    : 6,366,619 B1
DATED         : April 2, 2002
INVENTOR(S)   : McCallister et al.

It is certified that error appears in the above-identified patent and that said Letters Patent is hereby corrected as shown below:

Column 13,
Line 57, replace "con strained-" with -- constrained --.

Column 14,
Line 44, replace "implements" with -- implement --.

Signed and Sealed this

Fifth Day of November, 2002

Attest:

Attesting Officer

JAMES E. ROGAN
Director of the United States Patent and Trademark Office